United States Patent
Showen (10) Patent No.: US 9,348,010 B1
(45) Date of Patent: May 24, 2016

(54) ACOUSTIC SURVEY METHODS IN WEAPONS LOCATION SYSTEM

(75) Inventor: Robert L. Showen, Los Altos, CA (US)

(73) Assignee: ShotSpotter, Inc., Newark, CA (US)

( * ) Notice: Subject to any disclaimer, the term of this patent is extended or adjusted under 35 U.S.C. 154(b) by 956 days.

(21) Appl. No.: 13/564,640

(22) Filed: Aug. 1, 2012

Related U.S. Application Data (63) Continuation of application No. 12/028,751, filed on Feb. 8, 2008, now Pat. No. 8,325,562.

(60) Provisional application No. 60/900,573, filed on Feb. 9, 2007.

(51) Int. Cl.
*G01S 5/00* (2006.01)
*G01S 5/22* (2006.01)

(52) U.S. Cl.
CPC ........ *G01S 5/0036* (2013.01); *G01S 5/22* (2013.01)

(58) Field of Classification Search
CPC .......................... G01S 5/18–5/28; G01S 3/08
USPC ................................................... 367/127
See application file for complete search history.

(56) References Cited

U.S. PATENT DOCUMENTS

| | | | |
|---|---|---|---|
| 3,139,151 A | 6/1964 | Spandock |
| 4,555,779 A | 11/1985 | Roberts |
| 5,446,465 A | 8/1995 | Diefes et al. |
| 5,471,433 A | 11/1995 | Hammell et al. |
| 5,825,328 A * | 10/1998 | Schipper et al. ......... 342/357.29 |
| 5,930,202 A | 7/1999 | Duckworth et al. |
| 5,973,998 A | 10/1999 | Showen et al. |
| 6,178,141 B1 | 1/2001 | Duckworth et al. |
| 6,934,632 B2 | 8/2005 | Hatch |
| 6,985,839 B1 | 1/2006 | Motamedi et al. |
| 7,203,132 B2 | 4/2007 | Berger |
| 7,376,045 B2 | 5/2008 | Falkenberg et al. |
| 7,474,589 B2 | 1/2009 | Showen |

(Continued)

FOREIGN PATENT DOCUMENTS

ZA  9305960  8/1993

OTHER PUBLICATIONS

Spread Spectrum Communications Handbook, McGraw-Hill, Electronics Edition, 2004 (Originally 1985).
Kaimal, J.C. & Businger, J.A., "A Continuous Wave Sonic Anemometer-Thermometer", J.A. Journal of Applied Meteorology, vol. 2, Issue 1, pp. 156-164, Feb. 1963.
Duke, Peter S., Direct-Sequence Spread-Spectrum Modulation for Utility Packet Transmission in Underwater Acoustic Communication Networks:, Master's thesis, Naval Postgraduate School, Monterey, CA, Sep. 2002.

(Continued)

*Primary Examiner* — Luke Ratcliffe
(74) *Attorney, Agent, or Firm* — Knobbe, Martens, Olson & Bear LLP (57) ABSTRACT

A survey method giving improvements in weapons fire location systems is disclosed. In an urban system with a distributed array in the midst of many buildings that block signal paths or create echoes, methods are provided to measure signal propagation. A survey or tour of the covered region uses a moving signal source to probe propagation inside the region. Survey results may indicate where more or fewer sensors are needed. Survey results plus current measured noise gives prediction of instantaneous system sensitivity. In addition, multipath propagation may be used to determine a location even when only one or two sensors detect the signal. In such exemplary cases, triangulation may be replaced or augmented by pattern recognition. Further, signals of the survey need not be acoustic impulses such as gunfire, but may be RF signals, or coded continuous signals so that gunfire-like sounds would not disturb citizens in the area.

17 Claims, 5 Drawing Sheets

(56) References Cited

U.S. PATENT DOCUMENTS

| | | |
|---|---|---|
| 7,796,470 B1 * | 9/2010 | Lauder et al. ............... 367/127 |
| 2006/0241916 A1 | 10/2006 | Sieracki |
| 2007/0033045 A1 | 2/2007 | Smaragdis et al. |
| 2008/0165618 A1 | 7/2008 | Robertsson |

OTHER PUBLICATIONS

Swanson et al., "Atmospheric Resolution Using spread Spectrum Acoustic Signals", The Journal of the Acoustical Society of America, vol. 101, Issue 5, p. 3102, May 1997, Abstract.

* cited by examiner

ACOUSTIC SURVEY METHODS IN WEAPONS LOCATION SYSTEM

CROSS-REFERENCE TO RELATED APPLICATIONS

This is a continuation of application Ser. No. 12/028,751, filed Feb. 8, 2008, now U.S. Pat. No. 8,325,562, which claims the benefit of U.S. provisional application No. 60/900,573, filed Feb. 9, 2007, which are incorporated herein by reference in entirety.

BACKGROUND

1. Field

The present innovations relate generally to methods and systems associated with locating events in real time using sensor arrays. More specifically, it relates to techniques for improving the performance of weapon fire location systems using data from an acoustic survey.

2. Description of Related Information

An urban gunshot location system has to detect gunfire in a complex and noisy acoustic environment. Because of the plethora of sounds present, a method is needed to discard the majority of non-explosive sounds and concentrate on sounds that can eventually be classified as gunfire. That problem was addressed in U.S. Pat. No. 5,973,998 "Automatic Real-Time Gunshot Locator and Display System." A key disclosure therein is the "Spatial Filter" concept, wherein widely-spaced sensors can only triangulate on sounds loud enough to traverse the large distances between several sensors.

A useful corollary to the spatial filter is that if a 4th sensor has an impulse at the time expected from the initial triangularization result, the location is robust enough (i.e., unlikely to be from unrelated sounds) so that it can be automatically presented to dispatchers. Multiple gunshots detected at only 3 sensors allow robust detection and hence dispatch from those 3 sensors alone, as they are nearly certainly correlated.

In an urban setting the buildings cause refraction, reflection, and blockage of audio waves propagating from gunfire to the various sensors. In moderately built up communities with a majority of 2 and 3 story buildings, the errors due to refracting around buildings can be 15 to 30 feet (in a flat area of a mile extent, the error will only be 10 feet). Reflections (multipath) are usually not important to triangulation if the direct path is also received, as subsequent impulses can be discarded. But in practice, one cannot be certain that the first impulse is a direct path due to the possibility of blockage. Presently the existence of a hole in the coverage area can only be determined if a known shot is not detected. Also, the sensitivity of the array at a given location to a given sized weapon can only be guessed instead of determined by measurement.

An attempt to mitigate against blockage is contained in U.S. patent application Ser. No. 11/546,529, filed 10 Oct. 2006, entitled "Acoustic location of Gunshots Using Combined Angle of Arrival and Time of Arrival Measurements," which is incorporated herein by reference. In this application the sensors determine the arrival times and the azimuths of the arriving impulses. So if the location determined from a given triad of sensors is consistent with the azimuthal measurements, then that triad can be trusted for this event. If the sensor azimuths do not point to the location then that sensor or the triad cannot be trusted. Azimuthal sensors also allow a fewer number of sensors to locate and confirm a location, and they can lift mathematical ambiguities for solutions where two roots are both acceptable.

SUMMARY

Systems and methods consistent with the invention are directed to surveying methods in weapons locations systems.

In one exemplary embodiment, there is provided a method of determining propagation within a region using a mobile source and a set of sensors, the method comprising surveying detectable propagation paths to the sensors in a coverage area, and recording propagation parameters between each sensor and each source location. According to further exemplary aspects, propagation parameters including multipath may be processed to enable improved location determination from fewer numbers of sensors.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely examples consistent with certain aspects related to the invention. Wherever possible, the same reference numbers will be used throughout the drawings to refer to the same or like parts.

Urban gunshot location systems typically use sparse distributed arrays of acoustic sensors which triangulate on gunfire. In a complex urban area with many buildings which block acoustic paths or create echoes, a method is provided to measure the acoustic propagation. A way to determine if there are an adequate number of sensors (or an excess number of sensors) is to perform an audio survey or tour of the covered region. A moving acoustic source is provided to produce signals densely inside the region, for example along all roads. If the signal is received at several sensors (say four or more) the propagation is adequate. If there are not enough sensors, the survey results will show where they need to be added. In addition, multipath propagation may produce a channel pattern which will uniquely determine a location even when only one or two sensors detect the signal. In this case, triangulation is replaced or augmented by pattern recognition. Another benefit is that real-time sensitivity for a given strength weapon at each point in the covered area can be determined based on present measured noise levels. The acoustic signal of the survey need not be an impulse such as gunfire, but it could be a coded continuous signal so that the disturbing sounds of gunfire would not disrupt citizens in the area.

Problems caused by refraction, reflection and blockage can be ameliorated or removed by using data obtained from an acoustic survey of the geographic area covered by the acoustic event locating system, for example, a gunshot location system. This acoustic survey may be performed by moving an acoustic source to a very large number of positions within the covered area. Then the sensors of a sensor array associated with the system receive acoustic signals from the source which characterize the propagation between each position on the survey to each sensor. The strength and time delays of every signal path (direct, refracted, or reflected) are stored in a database. While the examples presented here are for an acoustic system, substantially the same method can be used in improving knowledge of radio wave propagation. The method disclosed in this patent can assist in determining the coverage extent or ghosting of cellular, radio, or TV transmissions. Also, the source could be an optical flash with intensity corresponding to a muzzle flash. Then the sensors would need an optical or IR receiver.

If the sensors have an ability to measure the azimuth of the incoming paths, then that additional information is also stored. In one embodiment, a surveying source (e.g., mounted on a vehicle, potentially a garbage truck or a street-sweeper) determines its position (e.g., using GPS) and repetitively sends an acoustic signal in all directions as it "tours" a selected area. In some embodiments, the transmission time of each signal is also determined (e.g., using GPS) and stored at the source for later combination with the data from the sensors. Alternatively, or in addition, the survey may be conducted by transmitting the signals in the opposite direction, i.e., the sensors transmit acoustic signals, which are then received at the surveying site. An additional embodiment is to have a two-way propagation path, where either the moving source or the sensor could transmit, and the other end would have a transponder, which returns a replica of the received signal to the opposite end.

In some situations and/or embodiments, an RF signal may be used in place of acoustic signals, provided the RF signal frequencies have similar propagation characteristics as the acoustic signals, by matching their wavelengths.

Refraction in an urban setting changes the signal propagation delays. Consequently, the straight line assumption made in location determination by triangulation (also sometimes called trilateralization) is not as valid as desired. In an urban residential area with predominately two story buildings, the absolute error in location caused by refraction of acoustic waves are typically 15 to 30 feet when using widely-spaced sensors. Use of the recorded survey results can allow a correction to the standard triangularization method, giving superior location accuracy.

Reflections are often not confusing, as when the direct path is observable and the echoes arriving later can be identified and discarded. However, in the general case it may not be known if the first arriving impulse is the direct path signal or is a reflected signal. In case path blockage occurs (e.g., due to obstruction of the direct path by a building), then the first arriving echo or multipath may be misconstrued as being the direct path, leading to a false location. This situation accounts for occasional errors in location of up to hundreds of feet, depending on the echo path. While the use of sensor redundancy (i.e., having many sensors detect a typical event) can reduce the impact of blockage, this requires more sensors than should be necessary. A superior, more economical approach is to use the survey data to help provide a correct location.

When an unknown event occurs, its time of arrival (TOA) data may allow a standard triangulation to be made and a hence a trial location to be found. The stored data for the survey point closest to this trial location is then retrieved and inspected. If the trial location was reasonably accurate (say, within 200 ft.), then the stored survey result arrival times will match fairly well to those times for the unknown event. Then nearby survey points can be interpolated to improve the location. For example, the relative arrival times from the $2^{nd}$ and $3^{rd}$ sensors with respect to the initial reporting sensor can be compared to the database. The survey positions will be at discrete locations, like 100 feet apart along a street, and up to a few hundred feet between streets. In many cases the relative arrival times will be smoothly varying when interpolating between the survey points. In such cases, interpolation between the discrete data base points in North-South and East-West directions can be made to minimize the error of the unknown event's measured relative arrival times. When the coordinates are adjusted to the minimum summed error of the times, the "best fit" location is determined. The magnitude of the error can be reported to give the user an estimate of the goodness of fit. This procedure will potentially correct for refraction errors.

If, however, the unknown event gives a poor location—or no location at all because there were not enough responding sensors to triangulate—a search of the survey route still can be made. The search can start at route locations near the sensor that detected the earliest impulse. The hope is that there will be sufficient multipath (i.e., second or later impulses on a single sensor) detected in both the survey and the unknown event data to obtain a reasonable fit. First use relative times between sensors, if available, then use multipath times. Iterations as before in relative onset times can be made until a best fit location is found. The validity of that location depends on the extent to which the survey is an accurate and dense representation in the region, the number of arrival times (including multipath) detected, and the geometry of the event with respect to the sensor array.

The search above can be constrained if exactly two sensors respond by searching along the hyperbola which is defined by the single relative time available. Azimuthal data should be included if available. The azimuthal directions can guard against using echoes and hence not using an incorrect hyperbola in that circumstance. Azimuthal data will in some cases improve the results by lifting ambiguities, such as when an oblique triad is used with two valid mathematical solutions.

An important benefit of the invention is the ability to determine if a given strength weapon is detectable at a particular location against the noise level at the event time. Also, if a weapon is located, its strength can also be known, which may assist in classification. And if the system sensitivity were low as a result of high local noise or out-of-service sensors, then the expected imperfect coverage could be known and allowed for.

Figure 1:
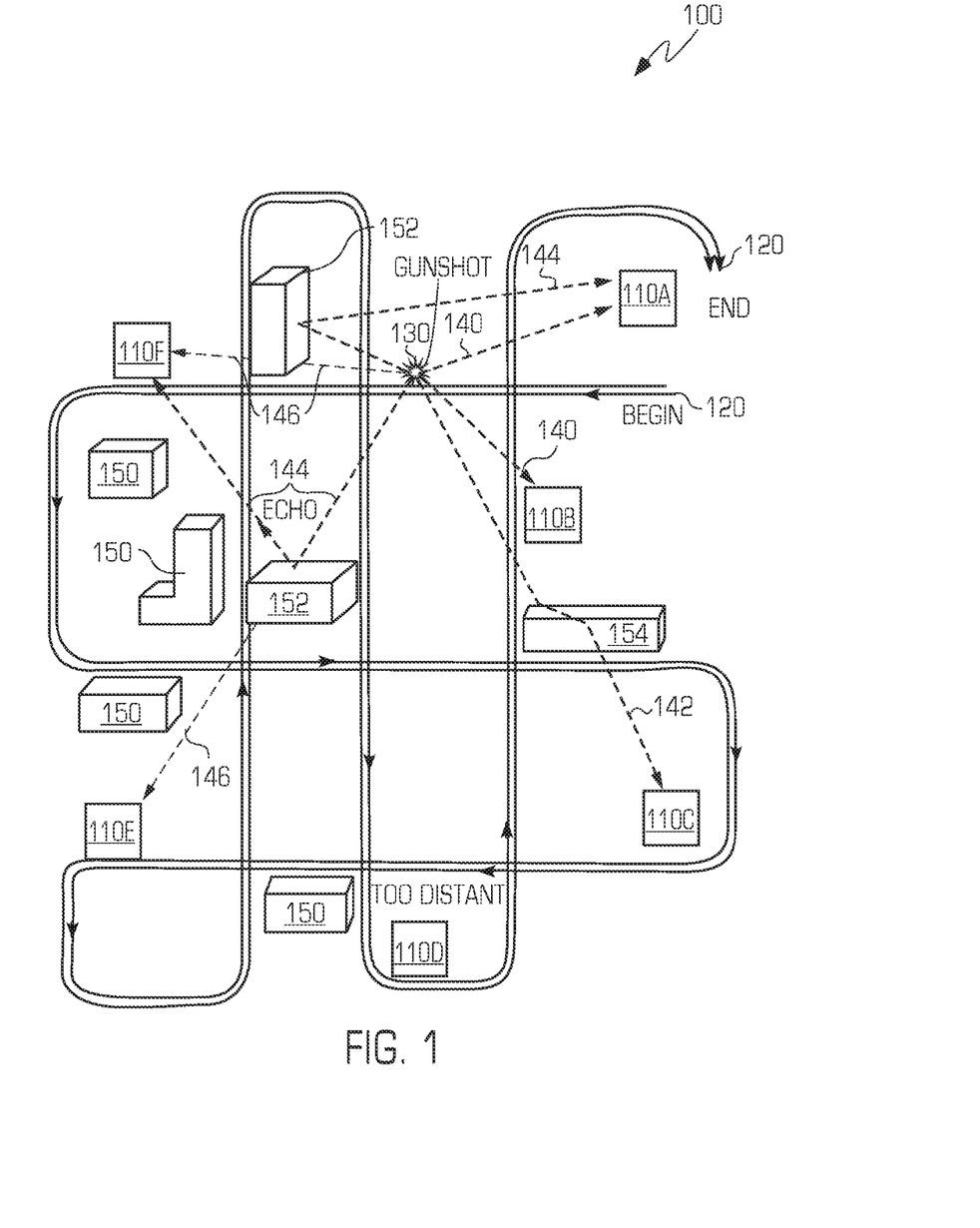
FIG. 1 is a diagram of an exemplary survey route through a coverage area with buildings and sensors, consistent with certain aspects related to the innovations herein.

Diagram 100 of FIG. 1 illustrates exemplary sensor positions, survey routes, buildings, and events. A region of interest is presented with sensor positions, the survey route (or tour), and an event. The survey route 120 with beginning and end is shown using the streets in the region. Also shown are buildings 150, including tall buildings 152 and low buildings 154 over or across which signals may travel in refracted paths.

A survey impulse event 130 (real or simulated gunshot) is fired. Note the event produces waves heading to the sensors, sometimes interfered with by buildings. Of the six sensors illustrated, four (110A, 110B, 110C, & 110F) receive impulses (one sensor is too far, another is blocked). Sensor 110A receives two impulses, a direct impulse 140 and an echo/multipath 144, sensor 110B receives one direct impulse 140, sensor 110C receives one refracted impulse 142, and sensor 110F receives one echo/multipath impulse 144. Also in this exemplary scenario, a path 146 to sensor 110E is blocked and not received. The survey data at the closest point to the event would indicate four sensors responding, with one having multipath.

Figure 2:
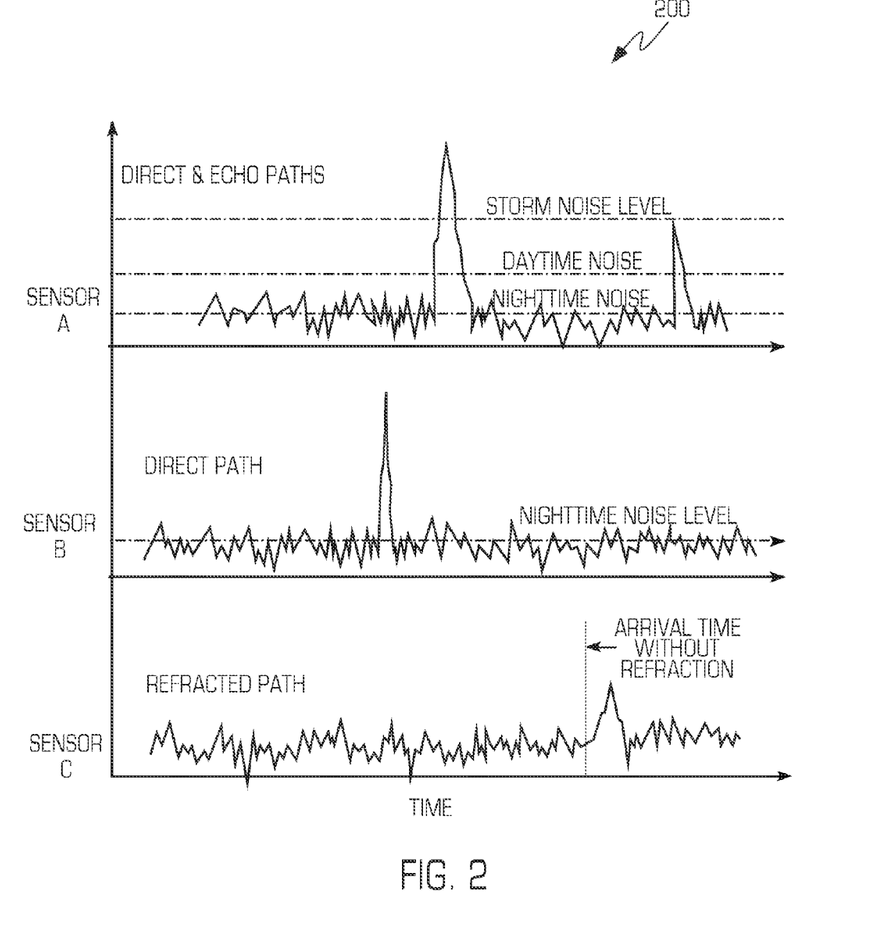
FIG. 2 is an illustration of exemplary complex acoustic waveforms, e.g., the first three sensors from FIG. 1, consistent with certain aspects related to the innovations herein.

The standard triangulation method uses relative arrival times; if it selected the sensor triad ABF, there would have been a considerable error in calculated location. If the triad selected was ABC, then the error would have been quite small due to the slightly refracted path. But the near collinear geometry of that triad would lead to dilution of accuracy and possibly to an ambiguous result where the hyperbolae from each pair might intersect at two locations. FIG. 2 illustrates a plot 200 of acoustic signatures for sensors 110A, 110B, and 110C from FIG. 1. An illustration of the postulated acoustic times series for the first three sensors 110A, 110B, and 110C of FIG. 1 is presented here. In the plot of sensor A 110A, both the direct and the echo (multipath) signal is seen, while for sensors 110B and 110C, only one strong path is present. Note for sensor 110C, the position of the actual onset is delayed and the impulse has a lower strength due to refraction around a building. Note also that higher noise levels reduce the amount of multipath and also make weaker sensors harder to detect.

Use of either azimuthal sensors or the database from the survey would select against using the wrong triad, and the survey database would in addition permit correction of the refraction error, if absolute timings are collected.

The survey is preferably conducted densely, for example along every street and accessible alleyway. The separation between database points along the survey route should also be small, nominally about 100 feet. This will provide a dense dataset which can provide accurate corrections using interpolation. The number of survey points would be of order 1,000 per square mile if the assumption is made that streets in an area having 10×10 blocks are surveyed.

Surveying through alleyways is particularly important, as here blockage, refraction, and reflection will be severe, limiting the propagation, and causing mini holes of coverage using the standard triangulation method. In alleyways, where crime may be quite prevalent, the survey will be quite beneficial in eliminating the mini holes.

In case a full survey is not feasible or required, a limited survey may be performed whose purpose is to characterize a mini hole such as in an alleyway. The expectation is that while only one or two sensors might hear the mini-survey signals, the echo environment will be so rich that the multipaths will permit location at the various points inside the alleyway. In one embodiment a loud and impulsive acoustic signal (e.g., such as from weapons fire) is generated at regular spacing down the length of the alleyway, and the multipath arrivals at the sensors are recorded.

The acoustic signals used by the survey could in principle be loud impulsive sounds or could be continuous or partially continuous sounds. Conceptually the simplest method is to fire off a rifle or a surrogate (gas explosions, M80s) along the survey route. An automated locator such as a GPS receiver co-located with the survey vehicle would assist in survey documentation. Knowledge of the exact time of a signal is preferred, as then propagation times to sensors are absolute and not relative. This could assist in directly showing any error in assumed sensor locations or in directly determining refraction effects along a single sensor path.

A less intrusive signaling method would be to use a coded acoustic signal to spread out the energy from a rifle sound (nominally 2 ms) to perhaps 2 second or longer, so the sound would be noise-like and hence far less obvious.

If a vehicle like a garbage truck or a street sweeper were equipped with a signaling audio source, such noisy vehicles would be a good cover to perform the survey quite innocuously. Details of such a signaling method are given during the discussions for FIG. 4.

Figure 3:
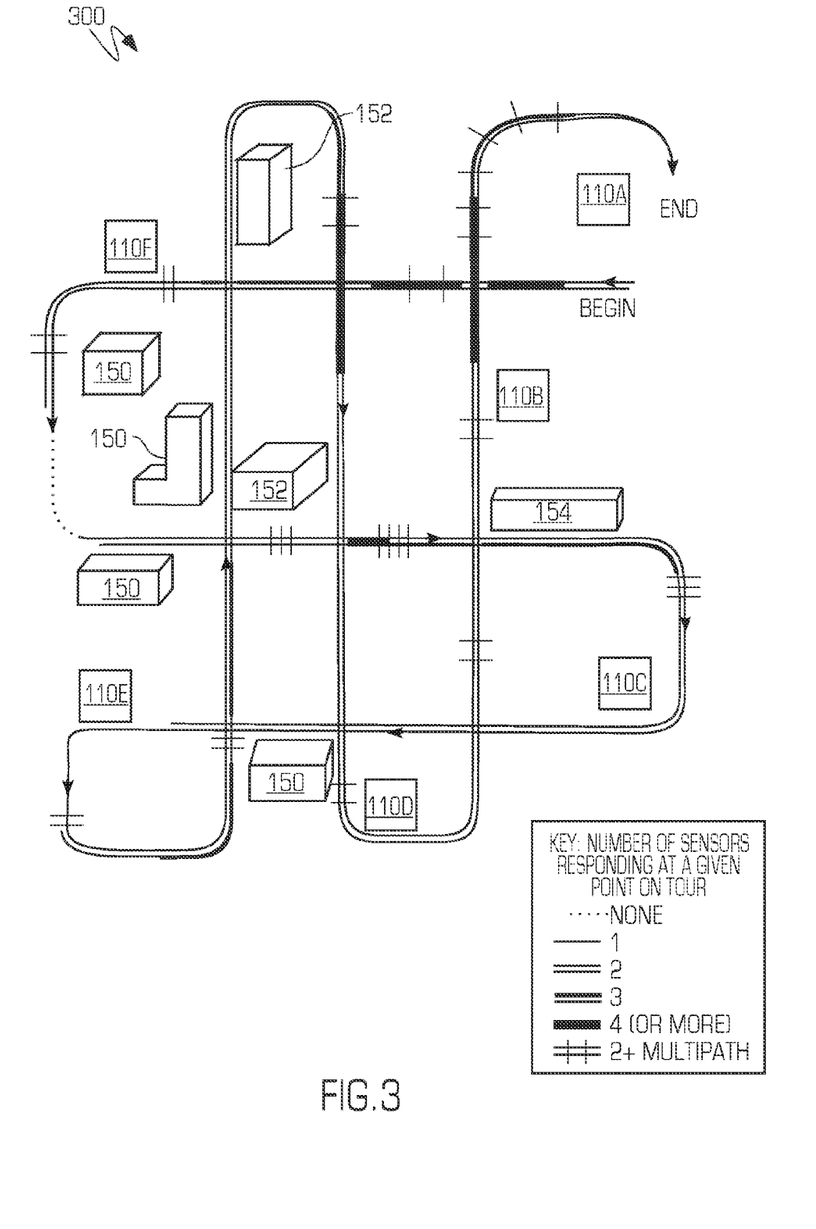
FIG. 3 is a diagram illustrating the exemplary results of a survey showing at each survey point the number of propagation paths including multipath, consistent with certain aspects related to the innovations herein.

FIG. 3 is a diagram 300 showing exemplary sensors, survey route, buildings, and propagation results. This illustrates the survey source movement, and shows where along the route there was propagation to 1, 2, 3, 4 or more sensors, as well as indicates where there was multipath. The number of cross-hatches gives the number of multipaths present at that point in the Survey.

An analysis of the survey (tour) data can provide knowledge of where there are holes in the coverage (i.e., not enough sensors) and where there is unnecessary redundancy (i.e., an excess number of sensors). Note that between sensors F and E none of the sensors are reached, due to blockage from the buildings. Hence to provide coverage in this region at least one additional sensor is required. After this new sensor is installed this region needs to be surveyed again. If that sensor has enough multipath to use for determining locations near it, then only one new sensor would be required. The survey should be redone whenever the sensor set is changed or buildings are significantly altered.

The survey should include areas well outside of the array limits, out to distances where just one sensor has measurable multipath. Here is precisely where the survey location method can assist the most, by using multipath in addition the scarce direct paths.

The survey is preferably performed on both calm and windy days in order to characterize the propagation under both conditions. Since the wind velocity increases with height, a source near the ground will have rays emitted horizontally be bent downwards while travelling with the wind, and upwards against the wind. Hence the sound can be heard further downwind than upwind. The effect on the coverage area with respect to a fixed array is that coverage may be slightly skewed towards the upwind side of the array, and that it will be eroded on the downwind side. The survey should be performed once for each cardinal wind direction commonly occurring at that city.

The strength of the signals used in the survey should be strong enough to be equivalent to, if possible, typical loud gunfire. The absolute survey signal strength should be known. Since the background noise is lower at night, the most sensitivity will come when the survey is performed at night. The array noise and the signal strength should be measured at each sensor during the survey to determine the signal to noise ratio (SNR) for each recorded path. For the conditions of the survey, a map can be generated showing where 4 or more paths are received, and hence gunfire could be detected and confirmed. For other conditions, the survey will allow prediction in real-time of the system sensitivity to a specific strength of weapons or events, given the current noise level. Hence a real-time, dynamic coverage map of the area can be constructed. The prediction is easily made by scaling the given weapon strength compared to the survey strength, and the survey noise to the current noise. If the resulting predicted SNR is above unity a given path can be detected and so detectability of each survey path is determined for the currently-measured noise. If there are a 4 or more paths at a given point detectable, the point can be included in the present coverage map. The boundaries of that map will shrink as noise increases, and any included holes should expand in size.

To formulate mathematically this verbal description of adjusting the coverage map to the present conditions, define the following quantities for each path at each survey point:

Surveyed shot Amplitude is As
Present postulated shot Amplitude is Ap
Surveyed path Strength and Noise are Ss and Ns
Present path Strength and Noise are Sp and Np
  Where Sp=(Ap/As)*Ss
The surveyed SNRs=(Ss−Ns)/Ns
The present SNRp=(Sp−Np)/Np=((Ap/As)*Sp−Np)/Np.

If the number of paths at a given survey point having SNRp>1 is 4 or more, that point can be included as locatable in the present prediction map.

Another, similar procedure can be made, once a new unknown event is located, to determine its absolute strength using the acoustic survey results. Take the set of measured propagation strengths, and compare each of them with the survey strengths by taking their ratio. If the ratios are roughly similar, then the average of the ratios gives the unknown strength with respect to the known survey strength.

As indicated above, wind is a consideration for propagation. For the precise accuracy demanded on the timings, the average wind velocity should be measured during the survey and the survey timings compensated. Likewise, the current wind direction and speed is to be measured, and the survey with the wind closest to the present direction should be used. Interpolation to better match the wind direction can also be done. It is well known in the literature how to compensate acoustic propagation times for a given wind speed and direction. See, for example "A Continuous Wave Sonic Anemometer-Thermometer," by Kaimal, J. C. and Businger, J. A. Journal of Applied Meteorology, vol. 2, Issue 1, pp. 156-164, February 1963, http://adsabs.harvard.edu/abs/1963JAp Me . . . 2 . . . 156K, abstract, http://ams.allenpress.com/archive/1520-0450/2/1/pdf/i1520-0450-2-1-156.pdf, text and figures.

Figure 4:
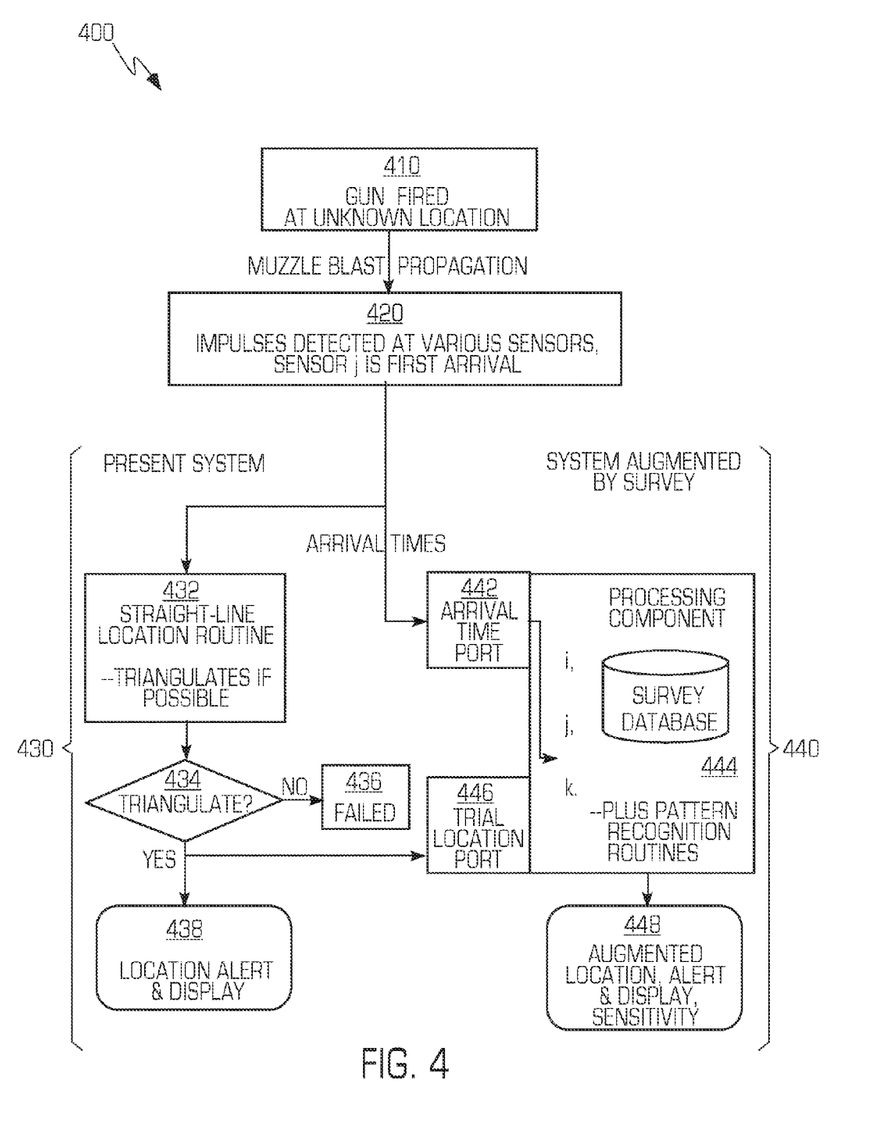
FIG. 4 is a block diagram illustrating an exemplary method of augmenting with a Survey the present location method, consistent with certain aspects related to the innovations herein.

FIG. 4 is a diagram incorporating exemplary survey results 400, which illustrates a system diagram of how the survey data together with pattern recognition improves present system results.

Improvement above the standard location method relies on having an adequate survey database with arrival times and amplitudes for all propagation paths (direct, refracted, and echo) between each point on the survey and every sensor that detects a signal from that point. When an event occurs at an unknown location and time 410, the impulses are detected at various sensors 420; in the case illustrated the first pulse arrival is at sensor "j." All the received impulses are sent to the straight-line location routine 432 and to the survey database 444. The database is organized to accept inputs either from an "arrival time port" 442 or from a "trial location port" 446. The pattern recognition can begin with inputting and sorting the arrival times before the triangulation routine finishes and provides a trial location.

For an arrival time with sensor j detecting the first impulse, the database is entered where j arrivals are the earliest. Then the time to the 2nd-arriving sensor is compared with corresponding database times, finding the best matches in relative arrival times for the initial impulses in each subsequent reporting sensor. A 'match' occurs when that survey point is found where the survey and current relative arrival times have minimum differences, or more properly, the minimum squared error (MSE) between relative onset times is found. A 'better match' is found by interpolation between adjacent survey points to obtain a more exact source location. Then multipath times (if existing) are compared with the database multipath to obtain the 'best match' location.

Meanwhile the straight-line location routine processes a location from the input times. If it can triangulate 434 successfully, it gives a location alert 438; if not, it failed 436. If successful it also sends a "trial" location (the best it can do alone) to the database's port 446, where pattern recognition routines engage. If a pattern is reasonably well matched by the data (within about 50 ms), a refinement is made and reported 448. If the location is not matched well, as when the sensor triad in the triangulation method inadvertently used an echo path, then pattern recognition can proceed to find a superior solution.

Aspects and advantages of the FIG. 4 should also be noted with regard to processing without survey information 430 as well as processing augmented with survey information 440. For example, representative systems involving processing without survey information are typically characterized by: requiring 3 sensors to locate a weapon fire incident as well as a fourth sensor to confirm the location; refraction errors, as the necessary data and data processing are absent; occasional large errors stemming from echos; and possible ambiguous location information when, e.g., a set of 3 sensors does not receive adequate signal information (though this latter problem may be correctable with azimuthal sensors). Regarding systems augmented with survey information 440, processing is typically characterized by: a requirement of only 3 or 4 total paths (i.e., 1 to 4 sensors) to locate and confirm weapon fire incidents; capability of correcting for refraction errors; the ability resolve echoes and 3-sensor ambiguities via pattern matching; and knowledge of absolute source strength and present system sensitivity.

In rare occasions when the two input ports to the database come to alternate solutions, or both differ from triangulation, adjudication will be made, likely by scoring the goodness of fit (MSE) of the arrival times.

In further exemplary situations or implementations associated with FIG. 4, an RF signal or an acoustic signal may be used in lieu of the other, with the expectation that the RF or acoustic signals would have similar propagation characteristics as the other, if their wavelengths were roughly matched. Reasons to use one as a surrogate for the other include that a particular transducer is more realizable, that the desired bandwidth was more easily achieved, that the nuisance of using one was reduced more by one than by the other. RF is meant here to include all electromagnetic frequencies; likewise, acoustic is to include all frequencies and propagation in fluids or solids. The combination of RF and acoustic propagation in a magnetic field as Alfvén waves is also included.

Such exemplary surveying implementations may also be employed using a scale model of the complex area to be investigated. For example, given an accurate scale model of a city with suitable construction materials, the model may be used instead of the actual city. Sensor positions are more readily adjusted in a scale model than in an actual city, the sources can be sent anywhere, and no citizens would be disturbed. Here, the wavelengths of the sources are adjusted by the scale factor. Such scale model implementations may also be employed when the model is larger than the actual area under investigation. An example of this is if a circuit chip with quasi-planar features required a characterization measurement more feasible at a lower frequency.

Figure 5:
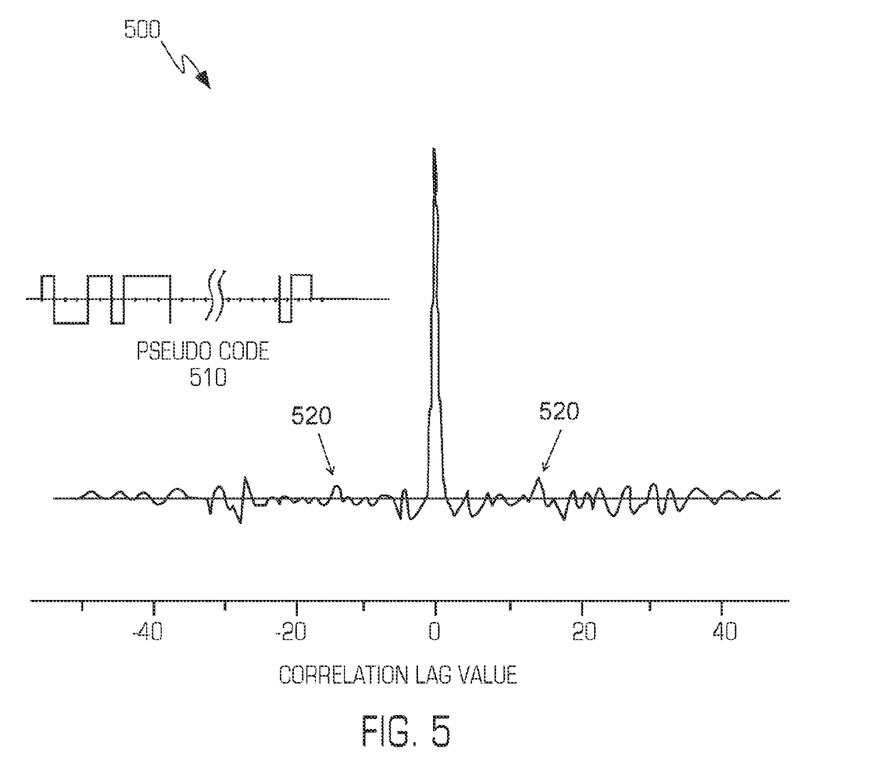
FIG. 5 is a diagram illustrating an exemplary method of creating a spread spectrum signal, consistent with certain aspects related to the innovations herein.

FIG. 5 illustrates plot 500 showing coded continuous signal. Illustration of a portion of a discrete code produced at the survey source, and the compressed response after decoding.

In order to conduct the survey with signals more acceptable to a community than loud gunfire (or similar noises), a method is included here to spread out the acoustic energy over time and make it far less noticeable. For such a scheme to be practical requires the ability to decode the signal and to transform it back to an equivalent short impulse. It also relies on the acoustic propagation in the atmosphere being sufficiently constant over the time and distances over which the signal is spread.

Waveforms commonly used in radar or communications system may be adapted to provide the desired properties. Many coding schemes are available to choose from, including linear chirps (which might sound obnoxious) to pseudo noise codes which would sound like colored white noise or hiss. One reference is Spread spectrum Communications Handbook, McGraw-Hill, electronics edition, http://cict.inatel.br/nova2/docentes/dayan/Electronic_Library/e-BOOK/Spread%20Spectrum/00_fm.pdf, 2002 (Originally 1985).

FIG. 5 illustrates a pseudo code 510 on the left showing reversals of the code phase at multiples of the baud (chip) rate. A low frequency sinusoid would be transmitted, with phase reversals occurring where the code changes sign. This spreads the original tone into a waveform which will be perceived by humans as hiss. When decoded (or compressed), this code has the form of the impulse shown on the right with only small sidelobes 520. The width of that lobe is approximately a chip length. The peak amplitude is equal to the code length (total number of bauds or chips). These codes have lengths given by $2^N-1$, where practical integers N might be from 8 to 13, giving code lengths of 63 to 8191. A code length of 1023 would hence give a compression ratio of about 30 dB, meaning that the continuous sound of the code can be 30 dB below the strength of gunfire.

An example of an acoustic spread spectrum application is given in a thesis on under water acoustic communications. The purpose in using this modulation was somewhat the same—to be undetectable to eavesdroppers while separating out multipath. [Direct-Sequence Spread-Spectrum Modulation for Utility Packet Transmission in Underwater Acoustic Communication Networks, by Duke, Peter S., Master's thesis, September, 2002, NAVAL POSTGRADUATE SCHOOL MONTEREY Calif.]

The tone frequency will be chosen to give desired propagation distance in the atmosphere up to 2 miles; likely values are between 300 and 2000 Hz. The baud or chip length (duration) would be chosen to give the required spatial resolution and to be a small multiple of the tone period. Values from 1 to 5 ms give modulation sidebands of 1 kHz down to 200 Hz, and spatial resolution of about 1 to 5 feet. Another constraint exists: the coherence of the propagation over the length of the code for the distances and refractions encountered. Coherence in the atmosphere with these parameters is discussed, for example in the abstract "Atmospheric resolution using spread spectrum acoustic signals," by Swanson et al., The Journal of the Acoustical Society of America, Volume 101, Issue 5, p. 3102, May 1997.

In certain circumstances it may be desirable to not modulate a tone, but just transmit the binary code itself, and reconstruct it upon reception. The code parameters (baud length, duration, and type) can be selected to give the desired lower and upper frequency span of the transmission. Different parameters can then be used to interrogate the propagation channel at different frequencies, which could determine the frequency capacity of the channel. Because atmospheric absorption over distance and each refraction bend in the path acts to suppress higher frequencies, interrogation at different frequencies and paths may allow disentanglement of these effects. Other codes types are explicitly included in addition to the pseudo random binary code illustrated here.

One indication of coherence from gunshot measurements is that when a sequence of shots is fired over a 5 second span from a stationary shooter, the placement of the locations is usually within a meter. This indicates that the propagation is somewhat variable, but likely within the tolerances required to not smooth out (depress) the peak lobe substantially using a 5 second duration code. For example if a baud length of 4 ms were chosen, the spatial resolution of 4 feet would match the inherent variability of the propagation.

A practical way to conduct the survey might be to mount an omni-speaker on a garbage truck or a street sweeper. At a velocity of 5 mph (7 fps), a street sweeper it would have over 12 seconds between survey points if the point separation were 100 ft. This will be adequate time to transmit a coded continuous-wave signal, and also adequate for the audio signal to propagate nearly 3 miles—well outside an array—before the next signal were launched. Place a GPS on the vehicle, send off a signal every 10 seconds, decode (compress) the impulses, and create the survey database.

When the source is moving at a constant velocity, the decoding needs to be adjusted to take into account the known uniform phase changes over the duration of the code, as is a common practice in coherent radars imaging a moving target.

The strength of the signal required would ideally be equivalent to that of a loud rifle, or 160 dB SPL re 1 m. With a 4095 baud-length code, baud length of 2 ms, code duration of 8 seconds, the compression is 36 dB, so the equivalent continuous wave power would be (160–36) or 124 dB. This is probably too loud to be acceptable, as a street sweeper has an intrinsic noise of 95 dB SPL. If a pistol at 140 dB (which can be heard for over a mile in the night) is the strength to be emulated, the equivalent continuous wave strength is 104 dB. This is still considerably stronger than the sweeper. However, noise from the street sweeper or garbage truck would tend to mask the code signal (which sounds like hiss) to people nearby. The street sweeper noise would itself not compromise the results, since the sweeper could only be heard by the nearest sensor, and that close-by sensor could easily detect the code.

In another exemplary implementation, gunfire from the community may provide a distributed set of sources. These source event positions would usually not be known except by location calculations from the gunshot location system itself (unless confirming evidence from witnesses or shell casings were available). Without such specific confirmation, this "community survey" may not be accurate enough to correct for refraction, but it could provide patterns of reverberation or multipath during good acoustic conditions which could provide a "community database." Then, if a new shot came in under less than ideal acoustic conditions (large noises, winds) but the sensors still received some associated multipath information, then the community database could be interrogated to provide a match and give a reasonable solution which would otherwise not be possible.

As disclosed herein, embodiments and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe signal processing components such as software, systems and methods consistent with the present invention may be implemented with any combination of hardware, software and/or firmware. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

I claim:

1. A method for improving gunshot location accuracy within a region using impulses from acoustic sources within a coverage area and a set of stationary sensors of an acoustic sensor array of a gunshot location system, the method comprising:

measuring propagation paths between the set of sensors and the acoustic sources within the coverage area, wherein the coverage area includes an urban environment characterized in that the propagation paths of gunshot impulses are influenced by the presence of buildings which cause refraction, reflection or blockage of acoustic transmissions;

wherein the step of measuring propagation paths comprises capturing propagation parameters from actual gunfire in a community, said propagation parameters including arrival times of gunfire impulses at the sensors, the arrival times modified by the refraction, reflection or blockage caused by external surfaces of the buildings;

recording propagation parameters of the acoustic impulses between sensors of the set of sensors and the acoustic sources;

determining correctness of the locations calculated from the measured arrival times in comparison against an actual known location provided via confirming evidence;

analyzing the propagation parameters to calculate a solution given via match of the measured arrival times against a dataset of prior community gunfire to improve prediction of performance, sensitivity or accuracy of the gunshot location system; and processing data determining a quantity of distinct propagation paths detectable at each location in the coverage area.

2. The method of claim 1 wherein the propagation parameters include one or both of arrival times and amplitudes.

3. The method of claim 1 wherein the sensors include one or both of azimuthal and/or elevation resolution as propagation parameters.

4. The method of claim 1 further comprising acquiring absolute timings of signal propagation.

5. The method of claim 4 wherein the propagation parameters include one or both of arrival times and amplitudes.

6. The method of claim 4 further comprising performing refraction error compensation as a function of the absolute timings.

7. The method of claim 4 wherein the propagation parameters include one or both of arrival times and amplitudes.

8. The method of claim 4 wherein the propagation parameters include a signal strength and/or an angle of arrival.

9. The method of claim 1 wherein the propagation parameters include one or both of arrival time of echoes and/or multipath signals.

10. The method of claim 9 wherein the propagation parameters include a signal strength and/or an angle of arrival of the echoes and/or multipath signals.

11. The method of claim 9 where the sensors include one or both of azimuthal and/or elevation resolution as propagation parameters.

12. The method of claim 9 further comprising acquiring absolute timings of signal propagation, and performing refraction error compensation as a function of the absolute timings.

13. The method of claim 1 wherein the propagation parameters include a signal strength and/or an angle of arrival.

14. The method of claim 13 wherein the propagation parameters include one or both of arrival times and amplitudes.

15. The method of claim 13 where the sensors include one or both of azimuthal and/or elevation resolution as propagation parameters.

16. The method of claim 13 further comprising acquiring absolute timings of signal propagation, and performing refraction error compensation as a function of the absolute timings.

17. The method of claim 1 wherein the confirming evidence includes evidence from a witness and/or shell casing.

* * * * *